Figure 3:
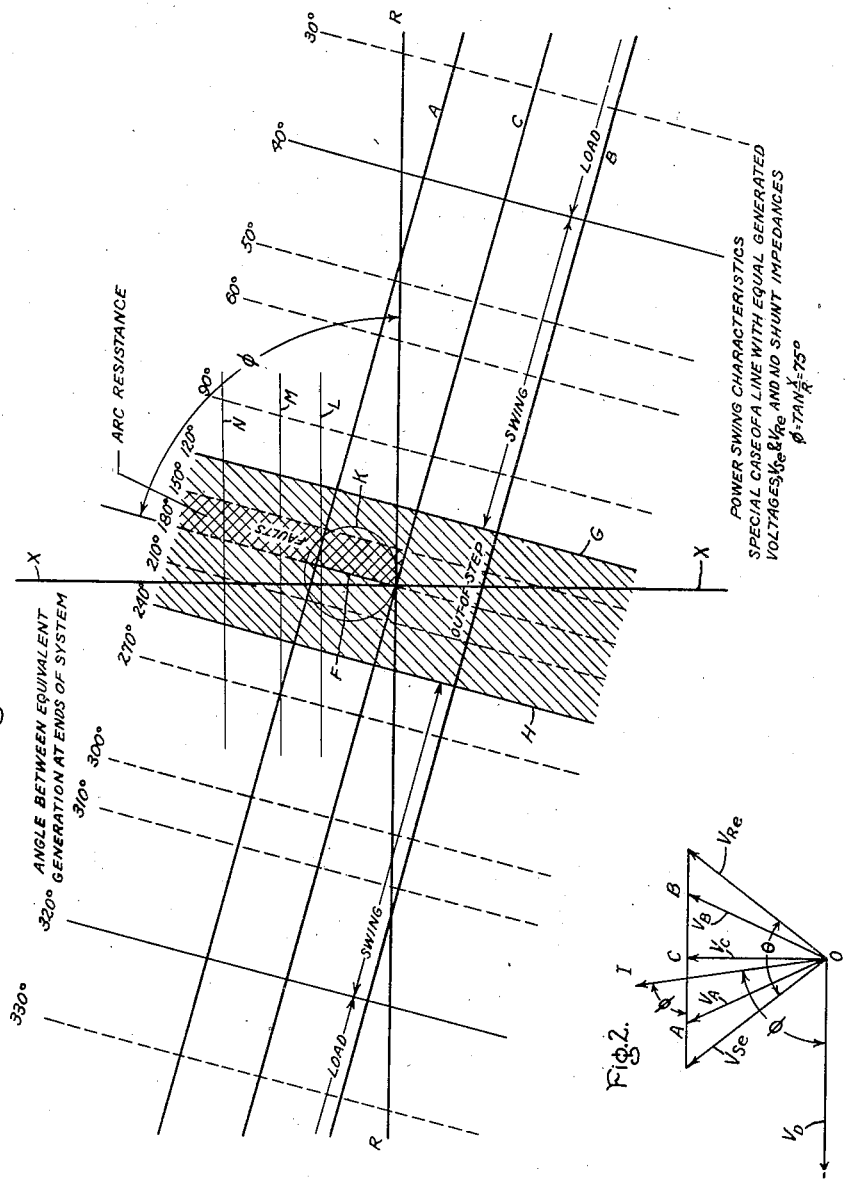

July 30, 1946.  A. R. VAN C. WARRINGTON  2,405,079
SUPERVISION OF ELECTRIC SYSTEMS
Filed Sept. 13, 1943  4 Sheets-Sheet 1
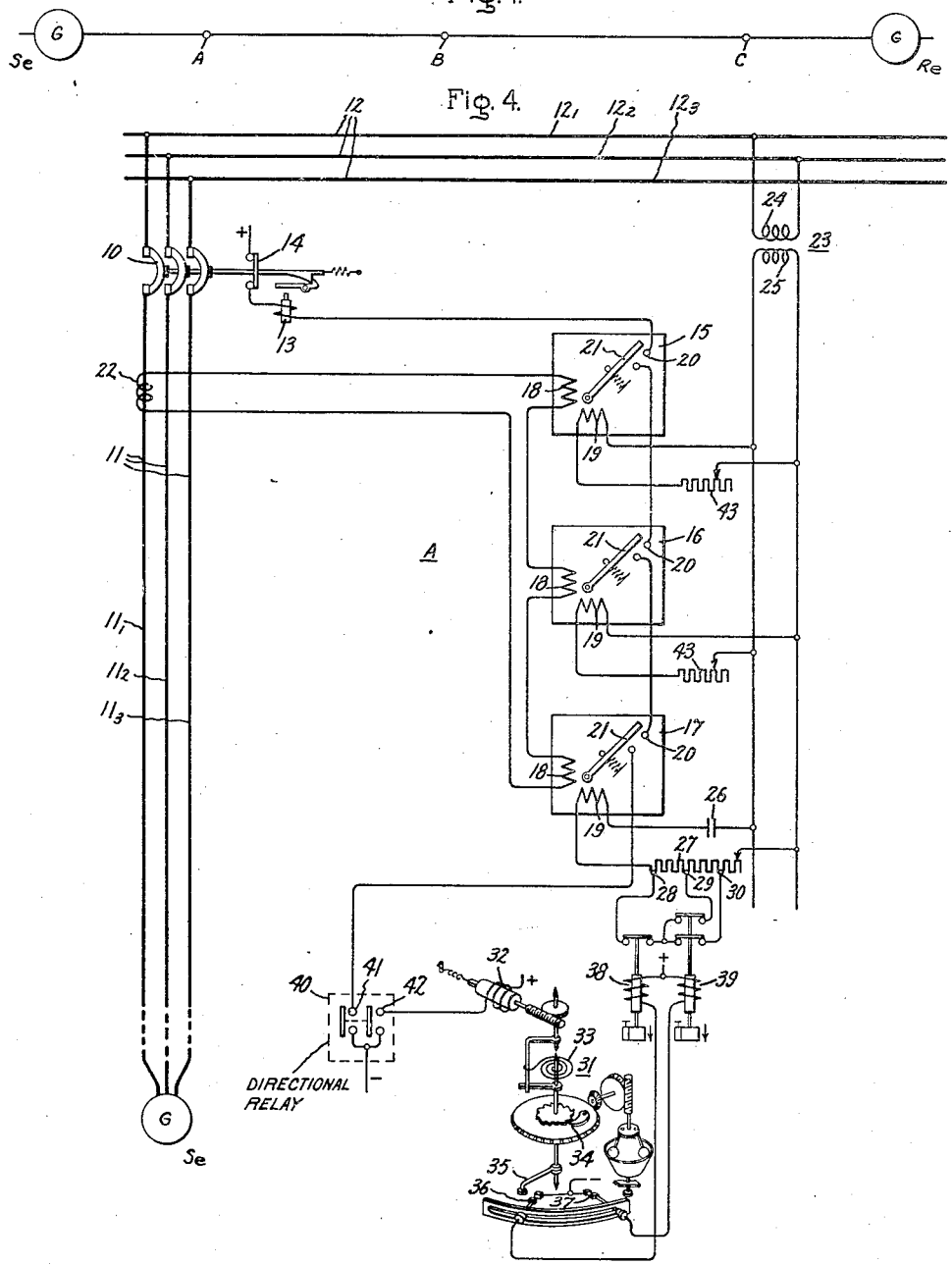
Inventor:
Albert R. van C. Warrington,
by Harry E. Dunham
His Attorney.

Inventor:
Albert R. van C. Warrington,
by Harry E. Dunham
His Attorney.

Patented July 30, 1946

2,405,079

UNITED STATES PATENT OFFICE 2,405,079

SUPERVISION OF ELECTRIC SYSTEMS

Albert R. van C. Warrington, Wallingford, Pa., assignor to General Electric Company, a corporation of New York Application September 13, 1943, Serial No. 502,156

30 Claims. (Cl. 175—294)

My invention relates to improvements in the supervision of alternating current electric systems and more particularly to a fault responsive protective system which also separates the system upon the occurrence of an out-of-step condition.

Faults on an alternating current electric system have been known to cause synchronous machinery to fall out of step and thereby to produce such unstable voltage and current conditions on sound portions of the system as to cause false operation of the fault responsive protective relays and circuit breakers controlled thereby on the sound portions. Obviously, such false operation must be avoided because loads are likely to be left without any source of power. In United States Letters Patent 2,095,117, granted October 5, 1937, and assigned to the same assignee as the present application there is disclosed and claimed a protective system which, on the occurrence of out-of-step conditions, subdivides the system in such a way as to eliminate the out-of-step condition while, at the same time permitting an adequate source of power for every subdivision. The system is preferably arranged to be subdivided at points where the normal exchange of power is small or such that the connected generating capacity in any subdivided part is sufficient to carry the load of that part. The arrangement disclosed and claimed in the above-mentioned patent, in order to distinguish between an asynchronous condition and a three-phase fault condition, requires three power reversals before tripping of the circuit breakers on out-of-step conditions can occur.

It would be desirable to have a protective system which not only would distinguish faults on the system from other conditions and properly isolate the system on the occurrence of such faults, but would instantly recognize an out-of-step condition and separate the system without delay at any predetermined point.

It is an object of my invention to provide a new and improved out-of-step protective scheme which operates the protective means earlier during the out-of-step condition than was heretofore possible.

It is another object of my invention to provide a new and improved protective system for quickly terminating an out-of-step condition in order to avoid the troubles associated with instability.

It is another object of my invention to provide a protective arrangement which will give complete protection for both fault, and out-of-step conditions, on systems involving long transmission lines.

It is a further object of my invention to provide a new and improved out-of-step protective system which depends for its operation on the difference in impedance measured at an angle approximately 90° from the characteristic impedance angle of the system.

Further objects and advantages of my invention will become apparent as the following description proceeds and the features of novelty which characterize my invention will be pointed out with particularity in the claims annexed to and forming a part of this specification.

Figure 2:
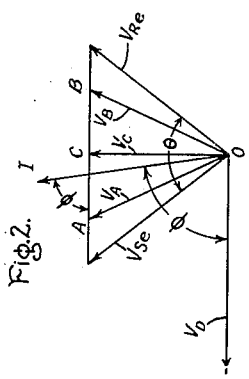
Figure 5A:
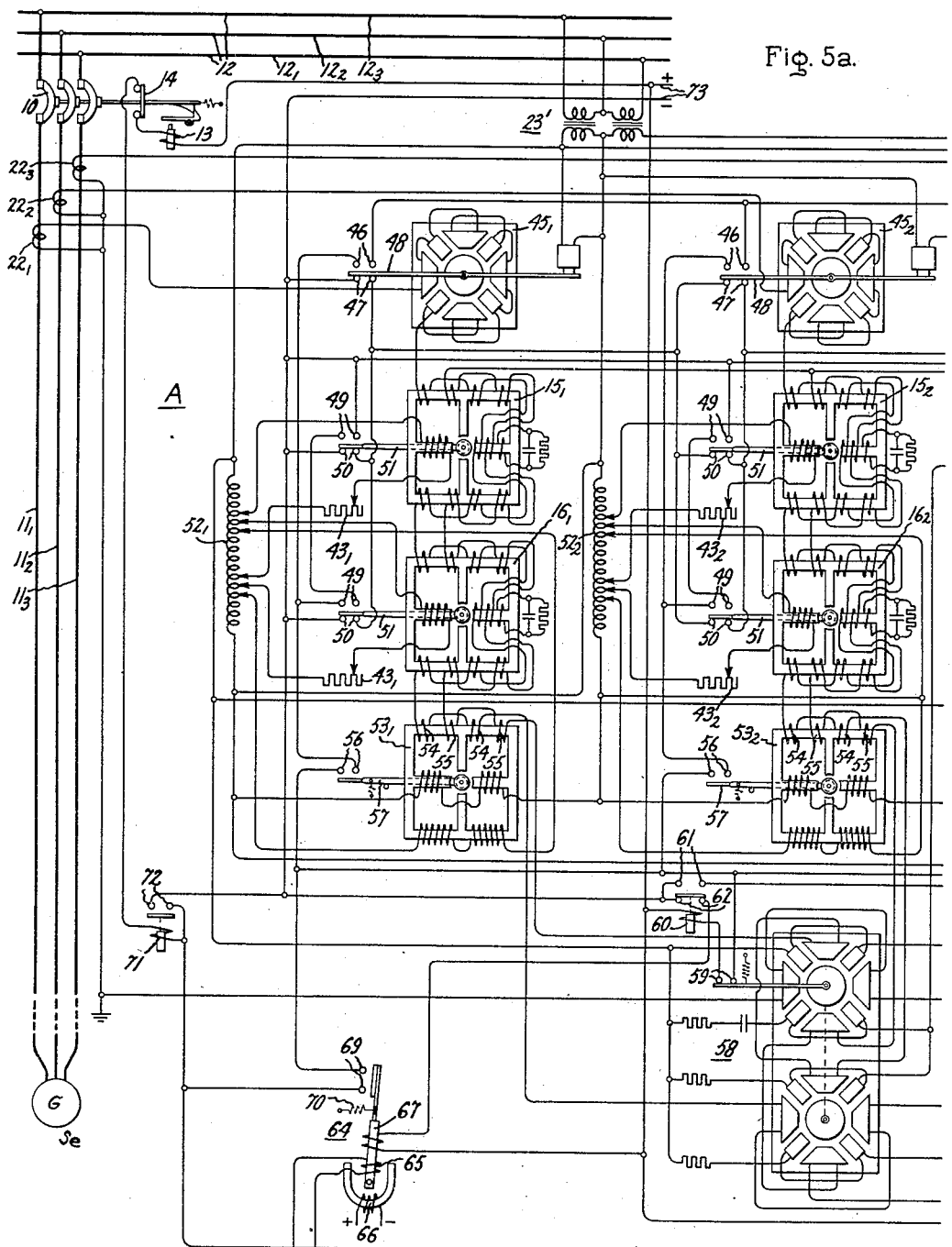
Figure 5B:
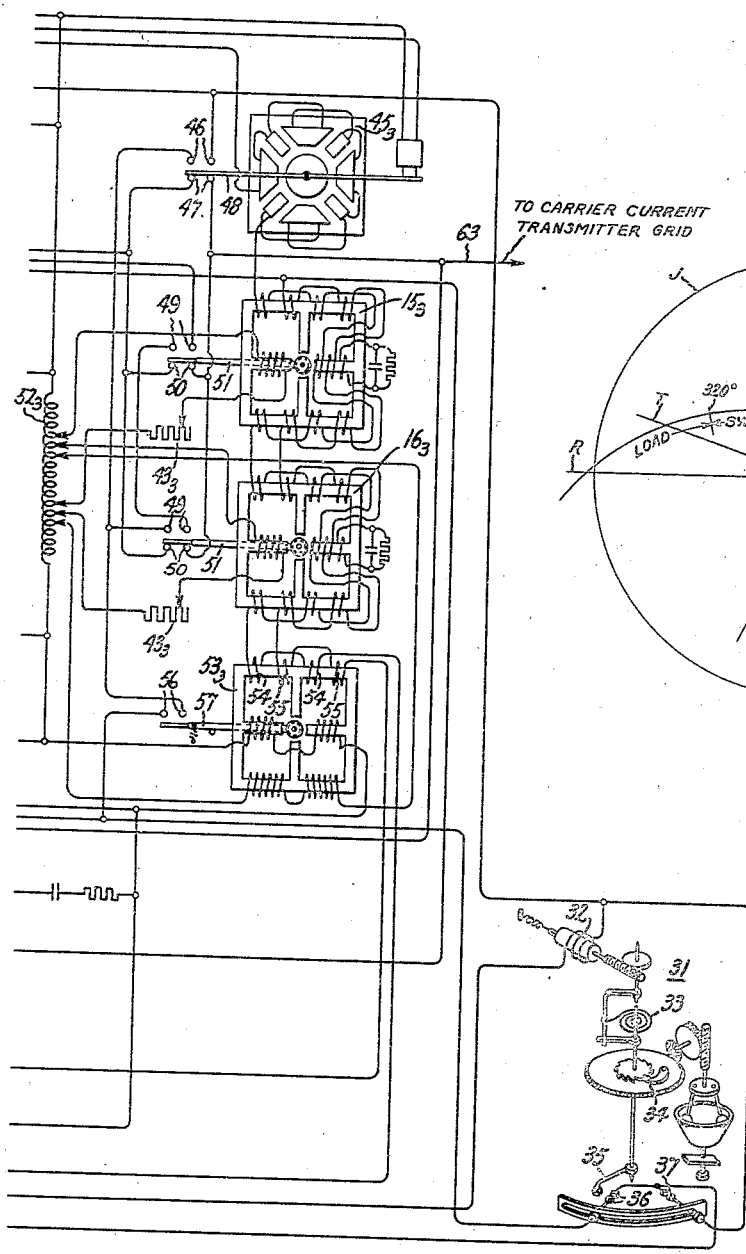
Figure 6:
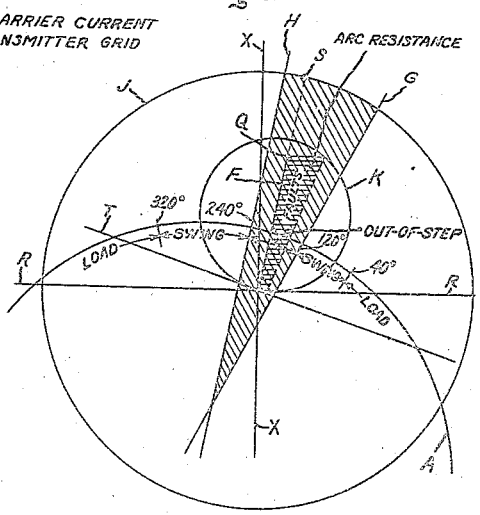

For a better understanding of my invention, reference may be had to the accompanying drawings, in which Fig. 1 is a single line diagram of an equivalent alternating current system; Figs. 2 and 3 are curve diagrams to aid in understanding my invention; Fig. 4 is a schematic diagram of a polyphase alternating current system illustrating one embodiment of my invention in which the protective arrangement embodying my invention is shown for only one phase conductor; Figs. 5a and 5b, together are a diagrammatic representation of a protective arrangement embodying my invention, particularly applicable for the protection of long lines, and Fig. 6 is a curve diagram to aid in understanding the operation of Figs. 5a and 5b.

Electric systems consist of a number of load points and generating stations tied together through transmission lines, some of the generating stations having a local load. The voltage of a part of the system having a preponderance of generation will lead insofar as angular position is concerned the voltage of another part of the system which has a preponderance of load. The phase angle between these voltages will increase with the amount of power transferred because of the increased line drop in the tie line. If extra load is added to or subtracted from the load at one of the stations the phase angle between those voltages will change to accommodate the new condition and will overshoot somewhat and then oscillate for a few cycles causing a power swing. Normally the voltages of generating sources are close together or, in other words, substantially in phase, but a fault will make them swing farther apart and if the fault is not corrected promptly it will cause them to swing 180° apart, in which case the slip of a pole will occur and the system becomes out of step.

An alternating current power system including a transmission line may be represented by a single line with grouped generators at the two ends thereof, or in other words, with the generating sources represented by equivalent generators located at the ends of the system. In Fig. 1 there is shown a single line diagram with the grouped generating sources or equivalent generators G shown at each end thereof. As the voltage of the equivalent generators at the two ends of the system becomes more separated in phase the difference voltage increases and consequently the current increases which flows between the two ends of the system while the potential at intermediate station falls. It will be understood by those skilled in the art that impedance relays, which measure the ratio of the voltage at some point along the line to the current flowing, might operate incorrectly upon the occurrence of a system oscillation, because a drop in voltage at the intermediate stations occurs combined with an increase in current, even though no fault exists on the system and even though the swing condition is within the limits of stable operation of the system. This will become more apparent particularly in connection with longer transmission lines as the following description proceeds.

The current and voltage relations existing in the system illustrated by Fig. 1 can be represented vectorially as shown in Fig. 2 wherein $V_{Se}$ and $V_{Re}$ represent the generated voltages and $V_A$, $V_B$ and $V_C$ are the voltages existing at the intermediate points, or substations A, B and C of the system shown schematically in Fig. 1. The system interchange current I is caused to flow by virtue of the voltage difference between the extremities of the system that is the vectorial difference between the vectors $V_{Se}$ and $V_{Re}$ and shown vectorially as $V_D$. The angle $\phi$ between $V_D$ and I represents the power factor angle of the system. The relays located at intermediate substations A, B and C, if of the impedance type, will see impedance values determined by the relation between the substation voltage such as $V_A$, $V_B$ and $V_C$ and the interchange current I. This impedance determined by the ratio of $$\frac{V_A}{I}, \frac{V_B}{I} \text{ or } \frac{V_C}{I}$$

will be referred to hereinafter as the input impedance of the system. As the load changes, the angle $\theta$, which is the angle between the vectors $V_{Se}$ and $V_{Re}$, the voltages at the substations A, B and C, and the current I, as well as the input impedance, will change.

The locus of the input impedance at a given location for the special case of a transmission line with equal generated voltages $V_{Se}$ and $V_{Re}$ and with no shunt impedances, has been shown at page 1513 of volume 56 of Electrical Engineering, December 1937, to be substantially a straight line on a polar reactance-resistance diagram. In the general case where the voltages $V_{Se}$ and $V_{Re}$ may not be equal and there may be shunt impedances such as line capacity, the locus of the input impedance at a given location can be shown to be a circle on the polar reactance-resistance diagram. For short lines, however, where the charging current is negligible and the voltage vectors $V_{Se}$ and $V_{Re}$ are substantially equal, the diameters of these circles on the reactance-resistance diagram are so great that the loci of the input impedance at different locations can be treated as a family of straight lines. Accordingly, in Fig. 3 I have plotted the loci of input impedances at stations A, B and C which are represented by straight lines A, B and C, respectively. It will be observed from Fig. 3 that the input impedance as seen from any particular point is a minimum when the terminal voltages of the equivalent generators G are displaced by 180 degrees and is infinite when the terminal voltages are equal and in phase since under this latter condition there would be no current flow. The angle $\theta$ is marked by lines perpendicular to the loci A, B and C of Fig. 3. During ordinary stable load conditions with reference to station A, the impedance is to the extreme left or extreme right on the curve A of the diagram of Fig. 3 within the range marked "load." As the load increases the impedance moves along the locus A toward the origin of the X and R axes and, if a system oscillation starts, it will enter the zone marked "swing" in Fig. 3. If the system oscillation is such as to go beyond the stability limits of the system the impedance moves into the zone marked "out-of-step." If a protective system is provided which can cause instantaneously a controlling operation when the impedance moves into the "out-of-step" zone then proper out-of-step protection can be obtained.

For a power line the power factor angle $\phi$, which is equal to the tangent of $$\frac{X}{R}$$

is a constant and consequently the power factor angle $\phi$ at the fault remains constant although the magnitude of this impedance varies with the distance to the fault for a uniform line construction. For a normal system, the angle $\phi$ might be in the neighborhood of 75 degrees and the line F in Fig. 3 is so drawn. The length of the solid portion of line F represents the length of a protected section of the line. Points along this line measured outwardly from the origin of the resistance-reactance diagram which corresponds to the place of location of the protective relays represent the impedance measured from the relays along the line to the fault, neglecting arc resistance. Due to the possibility of arc resistance in such faults the impedance measured by distance relays at stations A, B or C will fall somewhere within the double shaded area marked "Faults" in Fig. 3 so that whenever the impedance falls within this area a fault or serious out-of-step condition is indicated and the protective apparatus for a particular section of the system should operate if the fault is in that section. In this way, it is a simple matter to determine when a fault exists by means of ordinary distance relays which will distinguish clearly between internal and external faults for any length of lines. As the length of the line increases, however, the difference in magnitude of input impedance under load and fault conditions becomes less and it is possible under long line conditions for the input impedance under a load condition, insofar as the impedance or distance relay is concerned, to actually appear less than the input impedance under a predetermined fault condition.

On most systems if the angle $\theta$ between $V_{Se}$ and $V_{Re}$ reaches 120 degrees, then an actual out-of-step condition exists. The area on the polar reactance-resistance diagram of Fig. 3 where $V_{Se}$ and $V_{Re}$ are more than 120 degrees apart is represented by the area shaded with diagonal lines bounded by the lines G and H. With reference to Fig. 3, therefore, complete protection for a polyphase circuit such as a transmission line can be obtained, so as to isolate faults promptly and separate the system on an out-of-step condition without false isolation under other conditions, if operation of the protective system is confined within the area shaded by diagonal lines along the line F for a distance depending upon the reach of the impedance or distance relay. A suitable impedance relay having directional characteristics may be used to measure distance along the line F of Fig. 3 or a distance relay and a directional relay together may be used. If a single distance relay having directional characteristics is used, it may have a characteristic such as the circle K on the reactance-resistance diagram of Fig. 3 and operation thereof will be confined to conditions falling within circle K. Such an impedance relay is disclosed and claimed in United States Letters Patent 2,115,597—Traver, assigned to the same assignee as the present application.

My invention is particularly concerned with a protective system for any sort of line which will operate to isolate a faulted section for any sort of fault on the section. Furthermore, the protective system must separate the system instantly on out-of-step conditions and swings from which the system will not recover, and regardless of the length of the line, it should not operate to isolate a section or separate the system into separate parts on loads up to the steady state power limit.

Referring now to Fig. 4, I have illustrated my invention as applied to the protection of a polyphase alternating current system such as is disclosed in Fig. 1, in which the protective devices at station A are shown. The equivalent generator G at the sending end Se is shown in the same manner as in Fig. 1. An electric circuit interrupting device 10 is connected between the line section 11 on one side of station A and the line section 12 on the other side of station A. A portion of the line section 11 has been indicated by dotted lines to indicate greater length of line than is shown. My invention is concerned with protecting the section 11 of the adjacent circuit breaker 10 which will hereinafter be referred to as the protected section. Both line sections 11 and 12 have been illustrated as three-phase line sections comprising phase conductors 11₁, 11₂, 11₃, 12₁, 12₂ and 12₃, respectively. Circuit interrupting device 10 has been illustrated as a polyphase latched closed circuit breaker provided with a trip coil 13 and an "a" switch 14 which is closed when the circuit breaker is closed and open when the circuit breaker is open.

In Fig. 4 I have chosen, for the purpose of simplifying the drawings, to illustrate my invention with electroresponsive devices and associated apparatus for protecting one phase conductor of the protected section against certain faults occurring thereon. Actually, three such sets of electroresponsive devices would be required for complete distance protection against certain faults. It should be understood that polyphase electroresponsive devices might be employed instead of single phase devices, as shown. As illustrated, the protective system at station A comprises electroresponsive devices including three distance relays schematically shown and designated as 15, 16 and 17, respectively. These distance relays might be impedance relays although preferably they are constructed as distance relays of the reactance type disclosed and claimed in my prior United States Letters Patent 2,214,867. However, since the specific structure of these electroresponsive devices forms no part of the present invention other than that they should measure some function of impedance of the protected line section 11, I have chosen to illustrate these relays 15, 16 and 17 schematically as each comprising a current winding 18 and a potential winding 19. Each of these relays is also provided with a pair of normally open contacts 20 controlled by a movable contact controlling member 21.

The current windings 18 of relays 15, 16 and 17 may be connected in series with each other and energized from a suitable current transformer 22 associated with the phase conductor 11₁ of line section 11 adjacent circuit breaker 10. The potential windings 19 of reactance relays 15, 16 and 17 are energized with the potential obtained across phase conductors 12₁ and 12₂ through a suitable potential transformer 23 having a primary winding 24 and a secondary winding 25.

Distance relay 17 which may be of the reactance type so as to be unaffected by arc resistance is provided with a capacitor 26 connected in series with the potential winding 19 thereof to neutralize the inductance of winding 19 so that changing the resistance of a resistor 27 also connected in series with potential winding 19 of relay 17 may correctly vary the distance response or reactance measurement of relay 17. As will be understood by those skilled in the art, a reactance relay such as 17 will measure distance along the protected line section 11 of Fig. 1, represented by line F of Fig. 3 as projected on the X or reactance axis of Fig. 3. By measuring reactance in this manner no errors in distance response will be encountered by virtue of arc resistance. By properly adjusting the effective value of resistance 27, electroresponsive device 17 of the reactance type will have a characteristic such as represented by the lines L, M or N of Fig. 3. In other words, for a particular effective value of the resistance of resistor 27 which gives relay 17 the characteristic represented by the line L relay 17 will operate to close contacts 20 for all faults nearer to the relay than the distance along line F between the origin of the X and R axis and the point of intersection of the line L with the line F.

It is customary, in distance relaying, for the distance relay to operate instantaneously for all faults within a predetermined percentage, such as 90% for example, of the section of a protected line or circuit and to operate with predetermined time delay for faults farther out on the line beyond the end of the protected section. In other words, it is customary for a distance relay to operate with a stepped timed distance characteristic. I accomplish this by providing the resistance 27 with a plurality of taps, 28, 29 and 30, respectively. Ordinarily, substantially all of the resistance of resistor 27 is ineffective so that distance relay 17 will operate instantaneously for faults on line section 11 within the distance represented by the characteristic L of Fig. 3. A suitable timing unit, generally indicated at 31, is provided for controlling the effective resistance of resistor 27 which includes an electromagnetic motor unit 32. When motor unit 32 is energized it stores energy in a spring 33. This energy is released through an escapement mechanism 34 to actuate a movable contact 35 to engage different sets of adjustably positioned contacts 36 and 37 after a time delay depending upon the positioning of these contacts and the initial position of movable contact 35. As movable contact 35 engages with contacts 36 an auxiliary relay 38 is energized to cut in the portion of resistor 27 between taps 28 and 29 so that the operating characteristic of relay 17 is now represented by the line M of Fig. 3 instead of the line L which reach is well into the next section beyond the end of the protected section. When the contact 35 engages with contacts 37 auxiliary relay 39 is energized to cut in all of the resistance of resistor 27 between taps 28 and 30 so that the distance relay 17 of the reactance type now has an operating characteristic represented by the line N of Fig. 3 or in other words, reaches beyond the end of the next section adjacent to the protected section 11. It should be understood that instead of providing the distance relay 17 of the reactance type with a plurality of successively increasing distance responses with respect to time, as has been described above, the timing unit 31 may be modified so that contacts 37 cause direct tripping of the circuit breaker 10 if the fault persists in the proper direction along protected line section 11 for a predetermined time.

Since the distance relay 17 of the reactance type will operate for faults in either direction along the alternating current circuit and will reach out on either side of circuit interrupter 10, or in other words has no directional characteristics, it is necessary to provide in conjunction therewith a directional relay, preferably voltage restrained, which is schematically indicated as 40 in Fig. 4. This directional relay includes two sets of contacts 41 and 42 which are held open under normal load conditions by a voltage restraining torque. The contacts 42 are connected in series with the motor element 32 of timing unit 31 so that the timing unit 31 begins to function as soon as directional relay 40 indicates that an abnormal condition exists in a particular direction along the protected section. The contacts 41 on the other hand, are connected in series with the contacts 20 of distance relay 17 which in turn are connected in series with the contacts 20 of electroresponsive devices 15 and 16 as well as in series with the trip coil 13 and the "a" switch 14. If electroresponsive devices 15 and 16 were not present the arrangement disclosed in Fig. 4 would operate in the conventional manner from the standpoint of distance relay protection. It should be understood that distance relay 17 and directional relay 40 might comprise a single unit having both distance and directional characteristics, if desired with a characteristic such as the circle K of Fig. 3.

Electroresponsive devices 15 and 16 are not provided with the capacitor 26 in series with the potential winding, such as is reactance type distance relay 17. If no impedance is placed in series with the voltage windings 19 of electroresponsive devices 15 and 16 they are really resistance type ohm units with maximum torque on a line substantially parallel with the X axis of Fig. 3. By means of adjustable resistances 43 connected in series with each of the potential windings 19 of electroresponsive devices 15 and 16, it is possible for them to produce maximum torque at a small angle with reference to the X axis of Fig. 3, such for example as 20 degrees or the like, or in other words, to measure distance along lines parallel with the lines A, B and C of Fig. 3. The electroresponsive device 15 is adjusted in this manner so as to operate to close its contacts for all apparent impedance values which it measures to the left of line G of Fig. 3, which represents the operating characteristic thereof. The electroresponsive device or reactance type ohm unit 16, on the other hand, has its potential winding 19 energized with a polarity displaced by 180 degrees as compared with the energization of winding 19 of ohm unit 15 so as to have an operating characteristic represented by the line H of Fig. 3 so that closing of its contacts 20 is permitted only for apparent reactance values measured to the right of line G. The operating characteristics G and H are so chosen as to define between them the range of unstable operation of the system such as is schematically illustrated in Fig. 1.

The operation of the protective system of Fig. 4 in view of the detailed discussion included above, and particularly in view of the diagram of Fig. 3 will be obvious to those skilled in the art. Any faults which could occur on the protected section of the electric circuit would fall within the double shaded area of Fig. 3 marked "Faults" which would also be in the range so that relays 15 and 16 would close their contacts. Consequently, if the fault is within reach of distance relay 17, tripping of circuit breaker 10 would result. The characteristics of relays 15 and 16 are so chosen that any swing or load conditions would be outside the operating range of at least one of these relays. However, an out-of-step condition or a swing from which the system will not recover, would fall between the characteristics G and H so that out-of-step tripping of circuit breaker 10 for example would occur to separate the system instantaneously without waiting for a predetermined number of pole slips or reversals as was the case in prior art arrangements.

Although my invention has been described primarily in connection with a protective system including an out-of-step tripping arrangement it should be understood that it might also be applied to perform different control operations such as out-of-step blocking.

As has been pointed out above, when the length of the line to be protected increases the locus of input impedance at any particular relaying station along the line is a circle the diameter of which decreases as the length of the line increases. In Fig. 6 I have illustrated on a polar reactance-resistance diagram similar to Fig. 3 the conditions which exist on a long line such as one over one hundred miles in length. In general, insofar as this application is concerned, the expression "long line" refers to a line in which the length in miles exceeds the potential in kilovolts and furthermore one in which the electrical center is likely to be near the center section of the line. The corresponding parts of the diagram of Fig. 6 are designated by the same reference characters as in Fig. 3. It should be noted that the input impedance at relaying station A for a long line as portrayed by curve A of Fig. 6 changes very little as it approaches the out-of-step condition. Obviously then, the out-of-step protection afforded by operating a plurality of impedance units in progression as was done heretofore cannot be applied to long lines for out-of-step protection and my invention as described above, which differentiates very positively between power swings and out-of-step conditions, must be resorted to.

In Fig. 6 the line F represents the length of the protected line section and if there were no arc resistance a distance relay would measure impedance along the line F and if it were a reactance type distance relay it would measure the impedance along line F as projected on the X axis. Due to the possibility of arc resistance in a fault the impedance which a distance relay sees may fall to the right of the line F as viewed in Fig. 6 within the double shaded area marked "Faults." Proper protection against faults occurring on a protected line section of the length designated by the line F, which extends to the point Q marked thereon in Fig. 6, would require instantaneous tripping of the circuit breakers controlling the protected section for all conditions within the double shaded area of Fig. 6. A circle, such as K in Fig. 6, fits very well around the double shaded area with the center of the circle on the characteristic system impedance line F. Such a circle represents the characteristic of a directional relay with voltage restraint such as the starting unit SU disclosed in my prior Patent 2,214,867 referred to above. This unit measures a quantity which is "admittance at an angle." Since this quantity is in mhos such a relay is often referred to as a mho unit which corresponds to the term ohm unit often applied to a reactance relay which measures impedance at an angle. It will be obvious from Fig. 6 that such a mho unit or distance relay with directional characteristics having an operating characteristic represented by the circle K of Fig. 6, will tend to cause isolation of the protected section of the system on swing conditions within the stability limits of the syetem since operation of such a mho unit will occur for all conditions falling within the circle K. It is furthermore apparent that if the length of protected line section were still longer and hence extended beyond the point Q in Fig. 6, the diameter of the circle K would increase so that operation of the mho unit might occur even under ordinary load conditions.

If instantaneous operation of the protective system for the line section were confined between the lines G and H of Fig. 6 and within circle K, then false isolation on load or swing conditions would be completely eliminated, and only on swing coinditions outside the stability limits of the system, or in other words out-of-step conditions and actual fault conditions, would separation of the system or isolation of the protected section be permitted. In the event of an out-of-step condition the system would be separated, while on fault conditions actual isolation of the faulted section would result. As has been described in connection with Figs. 3 and 4, electroresponsive devices of the distance type are available having operating characteristics such as G and H of Fig. 6, which are displaced from each other by an angle which determines the amount of system separation permitted while still maintaining stable operation.

In order to give complete protection to a line section of a transmission line upon the occurrence of faults thereon, it is necessary that the circuit interrupting devices at each end of the line be simultaneously operated, and to this end carrier current relaying protective systems are usually employed. The standard carrier current relay equipment well known to those skilled in the art usually employs an impedance relay to start carrier when a fault occurs somewhere on the system. Such an impedance relay would have a characteristic which would take the form of a circle about the origin of the polar reactance-resistance diagram of Fig. 6, such as the circle J. It is obvious from Fig. 6 that for very long lines, such as the line having the impedance characteristic represented by F in Fig. 6, an impedance relay having the characteristic J would be unsuitable to control initiation of carrier current blocking or tripping since ordinary load or swing conditions would cause operation thereof. Accordingly, in Figs. 5a and 5b which together form a single schematic diagram, I have illustrated a protective system for the station A of the alternating current system of Fig. 1 which could now be considered as a long line in which the impedance of the line under fault conditions is not appreciatively less than under normal conditions. The corresponding parts of Figs. 5a and 5b are designated by the same reference numerals as in Fig. 4.

In Figs. 5a and 5b, unlike Fig. 4, I have illustrated the electroresponsive devices required for each phase conductor for protection against faults involving more than one conductor. Actually such a protective system would also be provided with ground fault protection means, but since this adds nothing to my invention it has been omitted for the sake of simplicity in the drawings. For each phase conductor of the protected line section 11 of Figs. 5a and 5b there is provided an impedance relay 45 specifically designated as $45_1$, $45_2$ and $45_3$ as applied to the protection of the phase conductors $11_1$, $11_2$ and $11_3$, respectively. The subscripts 1, 2 and 3 will be used hereinafter to distinguish similar devices provided for the various phase conductors. The specific construction of impedance relays 45 is of no importance in connection with my invention so long as they have operating characteristics similar to the circle J of Fig. 6, and consequently, no further description of impedance relays 45 will be included. I have illustrated these impedance relays specifically as of the type disclosed and claimed in my copending application, Serial No. 468,788, filed December 12, 1942, and assigned to the same assignee as the present application. Each of the impedance relays 45 is provided with a set of normally open contacts 46, and a set of normally closed contacts 47, which are controlled by a contact controlling member 48.

In order to produce the relay characteristics represented by the lines G and H of Fig. 6, each of the phase conductors of line section 11 is provided with corresponding electroresponsive devices 15 and 16, each marked with the appropriate subscript 1, 2 or 3, which devices correspond to the similar devices of Fig. 4. These electroresponsive devices have been specifically indicated as reactance type ohm units substantially identical with those disclosed and claimed in my prior Patent 2,214,867, except that no capacitor is provided in parallel with the adjustable resistance $43_1$, $43_2$ and $43_3$ with which each is provided. By properly adjusting the resistance $43_1$, $43_2$ or $43_3$ these reactance type ohm units 15 can be made to have the operating characteristic represented by the line G of Fig. 6 so as to close their contacts whenever the impedance conditions of the system are to the left of the line G. Such an ohm unit might, in the specific case illustrated, be referred to as a 30° ohm unit which means that it has a maximum torque when measuring the 30° component of impedance instead of the reactive component which was measured by the ohm units of my prior patent referred to above. The electroresponsive devices or ohm units 16, on the other hand, have an operating characteristic represented by the line H of Fig. 1 so as to measure the 20° component of impedance. These ohm units $16_1$, $16_2$ and $16_3$ are polarized as in Fig. 4, in opposite direction with respect to the potential polarization of the corresponding ohm units $15_1$, $15_2$ and $15_3$ so that the system impedance must be between the characteristics G and H, respectively, in order that operation may result in the same manner as has been described in connection with relays 15 and 16 of Fig. 4. Each of the ohm units 15 and 16 are provided with a set of normally open concontacts 49 and a set of normally closed contacts 50 which are controlled by a contact controlling member 51. The windings of relays 15, 16 and 45 are energized from current transformers 22 and open delta potential transformer 23' in accordance with the prior art disclosures mentioned above. The operation of the relays 15 and 16 may be varied by adjusting the taps on adjustable winding transformers 52 designated as $52_1$, $52_2$ and $52_3$, respectively, which are associated with the potential circuits of relays 15 and 16 as well as the mho units to be described hereinafter.

In order to produce the relay characteristic represented by the circle K of Fig. 6, I provide at station A for each phase conductor of polyphase circuit 11 an electroresponsive device or mho unit 53, specifically designated as $53_1$, $53_2$ and $53_3$, respectively. These mho units are substantially identical to the starting units disclosed in my prior Patent 2,214,867, except that each unit is provided with double current windings 54 and 55 distributed on either side of one of the poles of the mho unit instead of the single current windings disclosed in my above mentioned patent which are similar in every respect to the double current windings illustrated on the ohm units 15 and 16. These double current windings on the mho units 53 tend to cancel out the swing or load components of current so that the ohmic measurement of mho units 53 is not affected thereby. Each of the mho units 53 is provided with a set of normally open contacts 56 controlled by a contact controlling member 57.

In the event of a line-to-line fault or double line-to-ground fault closely adjacent to the relays at station A, it is possible that the voltage restraint of one or more of the mho units 53 may substantially disappear so that the circular characteristic K, which it normally has, becomes a straight line through the origin of the X—R axes and operation of the mho unit cannot be relied upon above a certain value of load. This is due to the fact that in such a case the voltage at the far end of the line controls the phase angle of the fault current while the phase angle of the relay characteristic is controlled by the voltage at the near end of the line. Consequently, wrong tripping or wrong operation of one or more mho units 53 may occur upon the occurrence of a line-to-line or double line-to-ground fault just outside the protected section adjacent the relaying station A, particularly when such fault is coupled with a heavy load current flowing in line section 11. False operation would result if the apparent impedance under such a condition fell in the shaded area of Fig. 6 outside circle K. To eliminate such wrong operation of one or more mho units 53, I provide a negative sequence power directional relay 58 connected so as to supervise the operation of the mho units. This relay is identical with the relay disclosed and claimed in McConnell Patent 2,160,599 and is provided with a set of normally closed contacts 59. This relay or electroresponsive device 58 like the mho units 53 has the windings thereof energized from potential transformer 23' and current transformers 22 in accordance with the disclosure of the McConnell patent referred to above. The characteristic of the electroresponsive device 58 is illustrated by the line T of Fig. 6 so that in the event the characteristic K of one or more of the mho units should become ineffective to prevent false operation for impedance conditions below the line T of Fig. 6, electroresponsive device 58 will open its contacts 59.

For additional controlling operations to be described hereinafter electroresponsive device 58 may also be provided with a set of normally open contacts if desired. I have chosen, however, to provide an auxiliary relay 60 the energization of which is controlled by contacts 59 of electroresponsive device 58 and which is provided with a set of normally open contacts 61 and a set of normally closed contacts 62.

In view of the fact that my protective system disclosed in Figs. 5a and 5b is particularly adapted, when provided with carrier current relaying equipment, to cause simultaneous operation of the circuit interrupting devices at both ends of the protected section for faults within the protected section, I have illustrated in Figs. 5a and 5b merely the main control elements of the carrier current equipment in so far as its association with the electroresponsive devices described above is concerned which includes the conductor 63 leading to the control electrode or grid of the carrier current transmitter and the receiver relay generally indicated at 64 which has a winding 65 connected to the plate circuit of the carrier receiver. The essential features of the carrier current equipment in so far as my invention is concerned, are that whenever negative potential is applied to conductor 63 the carrier transmitter stops transmitting and consequently stops blocking the operation of the protective relays associated therewith. The receiver relay 64, on the other hand, is held open by virtue of the energization of the winding 65 whenever carrier current is transmitted on the protected section by the transmitter at either end thereof. Receiver relay 64 is illustrated as a polarized relay having a polarizing winding 66 and a direct current holding coil 67. Whenever both windings 65 and 67 are deenergized, a contact controlling member 68 of receiver relay 64 is biased to close contacts 69 by means of a spring 70.

In order to prevent any damage to the contacts of the protective relays I provide in the trip circuit of circuit breaker 10 a seal-in relay 71 having normally open contacts 72 connected in series with the trip coil 13 across a source of energizing potential. As soon as contacts 72 are closed the winding of seal-in relay 71 is maintained in the energized condition through contacts 72 until the circuit is broken by opening of "a" switch 14.

Whenever a fault occurs anywhere on the system within the range of impedance relays 45, such as at point S on the line a considerable distance beyond the end of protected section 11 represented by the line F, one or more of the impedance relays 45 will open its normally closed contacts 47 and close its normally open contacts 46. The normally closed contacts 47 are connected in parallel with the normally closed contacts 50 of both of the corresponding ohm units 15 and 16 marked with the same subscript. The parallel arranged sets of normally closed contacts of relays 15, 16 and 45 are connected in series with the parallel arranged sets of normally closed contacts of relays $15_2$, $16_2$ and $45_2$, and also with the parallel arranged sets of normally closed contacts of relays $15_3$, $16_3$ and $45_3$. This series parallel combination of normally closed contacts is also connected in series with the normally closed contacts 62 of auxiliary relay 60 so as normally to connect conductor 63 to the negative terminal of potential source 73. A fault at the point S on the system beyond the end of the protected section represented by the line F in Fig. 6 would cause one or more of the impedance relays 45 to open their contacts 47 and will also cause the corresponding ohm units 15 and 16 to open their contacts 50 thereby removing the negative bias normally applied to the grid of the carrier current transmitter so that transmission of carrier current is initiated. Such transmission of carrier current will prevent receiver 64 from closing its contacts 69 by virtue of energization of winding 65 thereof and consequently will prevent instantaneous tripping of circuit breaker 10. Consequently, the normally closed contacts of the ohm units 15 and 16 marked with the same subscript and the normally closed contacts of the corresponding impedance relay 45 control the starting of carrier which cannot occur unless the impedance conditions of the circuit are such as to fall within the circle J and between the lines G and H of Fig. 6.

The motor element 32 of timing unit 31 is connected across the terminals of potential source 73 through the normally open contacts of the corresponding relays 15, 16 and 45 marked with the same subscript which are arranged in series with each other and this series arrangement of normally open contacts is connected in parallel with the corresponding series arrangement of normally open contacts associated with the relays for the other phase conductors of line section 11. Consequently, impedance relays 45 and the associated ohm units 15 and 16 not only start carrier whenever any three units marked with the same subscript operate, but they also start the timing unit 31. Since the fault at the point S is far beyond the end of the protected section, mho units 53 will not operate and consequently carrier will continue being transmitted to prevent energization of the receiver relay 64 to close contacts 69. However, contact 35 of timing unit 31 will after a predetermined time delay, engage contacts 36 but since contacts 36 are in series with the contacts 56 of mho units 53, all three sets of contacts 56 being in parallel with each other, tripping of circuit breaker 10 cannot result. If the fault at the point S still persists when the contact member 35 of timing unit 31 engages contacts 37, then tripping of circuit breaker 10 will result since the contacts 37 of timing unit 35 are connected in series with the normally open contacts 46 and 49 of the associated impedance relay and ohm units marked with the same subscript, which closed initially to start carrier and start the timing unit 31.

If the fault on the system occurred at the end of the protected section 11, such as is indicated by the point Q in Fig. 6 which is within the operating range of the relays having the characteristics represented by the circles J and K of Fig. 6 and the lines G and H, this indicates that one or more groups of relays having the same subscript including an impedance relay, a mho unit and both ohm units will operate to close their normally open contacts. As was pointed out above, this will cause the carrier transmitter to begin transmitting carrier current and will also cause timing unit 31 to begin to operate. The normally open contacts 56 of the mho unit $53_1$ and the normally open contacts 49 of ohm units $15_1$ and $16_1$ are connected in series with each other and this series arrangement of contacts is connected in parallel with similarly arranged contacts associated with the relays marked with the subscript 2 and also with the relays marked with the subscript 3. This series parallel combination of contacts is connected in the trip circuit of circuit breaker 10 in series with the contacts 69 of receiver relay 64. This series parallel combination of normally open contacts is also connected in series with the contacts 59 of relay 58 and the winding of auxiliary relay 60 across source 73. Therefore when the contacts 56 of one or more of the mho units 53 close, the winding of auxiliary relay 60 is energized so as to close normally open contact 61 and open normally closed contact 62 thereupon immediately restoring negative potential to conductor 63 and consequently to the grid of the carrier current transmitter (not shown) thereby stopping the transmission of carrier. Because the fault is within the protected section the protective relays at the other end of the line section will also prevent the carrier transmitter at that end from transmitting carrier current so that the winding 65 of the receiver relay 64 will be deenergized. Since contacts 62 of auxiliary relay 60, which are in series with the circuit for energizing holding coil 67 of receiver relay 64, are in the open position and winding 67 is deenergized the contacts 69 of receiver relay 64 are closed by virtue of spring 70 so that instantaneous tripping of circuit breaker 10 will result through the circuit including the contacts 69 of the receiver relay and the normally open contacts of a mho unit and two corresponding ohm units marked with the same subscript.

A fault beyond the end of the protected section but within the range of the mho unit if not cleared by other protective apparatus, will cause operation of circuit breaker 10 when the contact controlling member or timing unit 31 engages contacts 36.

In the event of an external fault close to the end of the protected section which might cause false operation of one or more of the mho units 43 due to the fact that the circular characteristic K thereof has changed to a straight line, the negative sequence power directional relay 58 will operate to open its contacts 59 so that instantaneous operation of circuit breaker 10 is prevented.

It will be apparent, therefore, that the protective system of Figs. 5a and 5b provides three zones of tripping of circuit breaker 10. The first tripping zone is the instantaneous zone which is limited to the end of the section by the blocking of the receiver relay by carrier current and in this case the trip circuit is completed through the normally open contacts of the mho unit and associated two ohm units marked with the same subscript as well as through the contacts of the receiver relay. The second zone tripping of circuit beaker 10 which is limited to about 10% beyond the end of the section by the circular characteristic K of the mho unit occurs when contact controlling member 35 of timing unit 31 engages contact 36. This circuit is also completed through any associated group of units marked with the same subscript comprising both ohm units and a mho unit. The third zone tripping of circuit breaker 10 is accomplished when contact controlling member 35 of timing unit 31 engages contacts 37. This operation is limited by the circular characteristic J of impedance relays 45 and the tripping circuit is completed through the normally open contacts of the associated group of relays marked with the same subscript comprising both ohm units and the impedance relay 45.

In view of the detailed description included above, the operation of the protective system disclosed in Figs. 5a and 5b will be obvious to those skilled in the art. Any impedance conditions of the system wholly outside the double shaded area of Fig. 6 but within the single shaded area between lines G, and H and K will represent an oscillation condition of the system outside the stability limits and out-of-step tripping to separate the system will result immediately without any undesirable delay.

Sometimes it becomes desirable to trip certain circuit breakers on out-of-step conditions in a particular order of stations which can readily be accomplished with my arrangement by merely grading the settings of the ohm units 15 and 16. With this arrangement it is possible to separate the system at the electrical center if desired whenever an out-of-step condition occurs, or at any other point by merely setting the ohm units so as to permit tripping at a smaller degree of system separation.

It will be understood that, while I have illustrated and described certain particular embodiments of my invention, modifications thereof will occur to those skilled in the art. I desire it to be understood, therefore, that my invention is not limited to the particular arrangements disclosed and I intend in the appended claims to cover all modifications and changes which fall within the true spirit and scope of my invention.

What I claim as new and desire to secure by Letters Patent of the United States is:

1. An arrangement for effecting a control operation when an out-of-step condition occurs on an alternating current system comprising a pair of electroresponsive devices energized from said system so as to have operating characteristics which when represented on a resistance-reactance diagram for said system are respectively lines substantially perpendicular to the locus of the input impedance of said system at different points on said locus with the spacing between said lines being such as to define a range of out-of-step conditions of said system.

2. An arrangement for separating an alternating current system upon the occurrence of a severe swing condition on said system comprising a pair of electroresponsive devices energized from said system so that their operating characteristics when represented on a resistance reactance diagram for said system are respectively lines substantially perpendicular to the locus of the input impedance of said system at different points on said locus, said operating characteristics of said devices being spaced so as to define between them a range of unstable power swing conditions of said system.

3. A protective system for isolating a section of an alternating current system upon the occurrence of a fault thereon and for separating the alternating current system at an appropriate point upon the occurrence of an out-of-step condition, comprising a plurality of ohmic responsive devices, one of said ohmic responsive devices being a distance relay, means for energizing said distance relay from said system so as to measure distance along said section between said one ohmic responsive device and the fault, and means for energizing two other of said plurality of ohmic responsive devices from said system so that they have impedance operating characteristics which on a resistance-reactance polar diagram for said system are lines substantially parallel to the fault impedance characteristic of said system and so spaced that out-of-step conditions on said system produce an apparent impedance condition which falls between the operating characteritics of said two ohmic responsive devices.

4. An arrangement for effecting a control operation when an out-of-step condition occurs on an alternating current system comprising a pair of ohm relays energized from said system so as to have operating characteristics which when represented on a resistance-reactance diagram are respectively lines substantially perpendicular to the locus of the input impedance of said system at different points on said locus with the spacing between said lines being such as to define between them a range of out-of-step conditions of said system.

5. An arrangement for causing operation of a circuit interrupting device in a polyphase alternating current system upon the occurrence of an out-of-step condition on said system comprising a pair of ohmic responsive devices energized from said system so as to have operating characteristics which when represented on a resistance-reactance diagram are respectively lines substantially perpendicular to the locus of the input impedance of said system at different points on said locus with the spacing between said lines being such as to define between them a range of unstable power swing conditions of said system.

6. In an arrangement for isolating a protected section of an alternating current system upon the occurrence of a fault thereon and for separating the alternating current system upon the occurrence of an out-of-step condition, the combination of a plurality of ohmic responsive devices for effecting a predetermined control operation when said devices are simultaneously in predetermined relative positions, means for energizing one of said devices from said system so as to measure distance along the protected section between the ohmic responsive devices and the fault, and means for energizing another of said ohmic responsive devices from said system so that said last mentioned ohmic responsive device has an impedance characteristic which on a resistance-reactance polar diagram for said system is a line substantially parallel to the fault impedance characteristic of said system.

7. In an arrangement for separating an alternating current system upon the occurrence of a severe swing condition on said system, the combination of a pair of electroresponsive devices, means for energizing said electroresponsive devices so that their operating characteristics when represented on a resistance-reactance diagram are respectively lines substantially perpendicular to the locus of the input impedance of said system at different points on said locus, said operating characteristics of said devices being spaced so as to define between them a range of unstable power swing conditions of said system, and means for connecting said electroresponsive devices so as to effect a control operation when a power swing condition falling within said range occurs on said system.

8. A protective system for a long polyphase alternating current transmission line having a length in miles exceeding its potential in kilovolts so that a normal load condition on said line might present less impedance than a fault on said line, comprising a plurality of electroresponsive devices for effecting a predetermined control operation when said devices are simultaneously in predetermined relative positions, at least one of said electroresponsive devices being a distance relay, and one of said electroresponsive devices having directional characteristics, means for energizing said distance relay from said line so as to measure distance along said line, means for energizing another of said electroresponsive devices from said line so as to distinguish between a fault and a normal load or swing condition in dependence upon an admittance characteristic of said line, and means for causing the other of said electroresponsive devices to control the effective operation of said distance relay.

9. A protective system for a long polyphase alternating current transmission line having a length in miles exceeding its potential in kilovolts so that a normal load condition on said line might present less impedance than a fault on said line, comprising a plurality of electroresponsive devices for effecting a predetermined control operation when said devices are simultaneously in predetermined relative positions, one of said electroresponsive devices being a distance relay, and at least one of said electroresponsive devices having directional characteristics, means for energizing said distance relay from said line so as to measure distance along said line, means for energizing another of said electroresponsive devices from said line so as to distinguish between a fault and a normal load or swing condition in response to an admittance characteristic of said line, and means responsive to a negative phase sequence quantity of said line and operative under a predetermined fault condition for preventing said electroresponsive device having directional characteristics from permitting false operation of said protective system.

10. A protective system for a long polyphase alternating current transmission line having a length in miles exceeding its potential in kilovolts so that a normal load condition on said line might present less impedance than a fault on said line, comprising three ohmic responsive devices, one of said ohmic responsive devices being a distance relay having directional characteristics, means for energizing said distance relay so as to measure distance along said line in a predetermined direction, means for energizing the other two of said ohmic responsive devices from said line so as to distinguish between a fault and a normal load or swing condition in dependence upon an admittance characteristic of said line, and means for causing said two ohmic responsive devices to control the effective operation of said distance relay.

11. A protective system for a long polyphase alternating current transmission line having a length in miles exceeding its potential in kilovolts so that a normal load condition on said line might present less impedance than a fault on said line, comprising three ohmic responsive devices, one of said ohmic responsive devices being a distance relay having directional characteristics, means for energizing said distance relay so as to measure distance along said line in a predetermined direction, means for energizing the other two of said ohmic responsive devices from said line so as to distinguish between a fault and a normal load or swing condition in dependence upon an admittance characteristic of said line, means for causing said two ohmic responsive devices to control the effective operation of said distance relay, and means responsive to a negative phase sequence quantity of said line and operative under a predetermined fault condition which causes said distance relay to lose its directional characteristics to prevent said distance relay from causing false operation of said protective system.

12. A protective system for a long polyphase alternating current transmission line having a length in miles exceeding its potential in kilovolts so that a normal load condition on said line might present less impedance than a fault on said line, comprising a plurality of electroresponsive devices for effecting a predetermined control operation when said devices are simultaneously in predetermined relative positions, one of said electroresponsive devices being a distance relay and at least one of said electroresponsive devices having directional characteristics, means for energizing said distance relay from said line so as to measure distance along said line, means for energizing another of said electroresponsive devices from said line so as to distinguish between a fault and a normal load or swing condition in response to an admittance characteristic of said line, and means operative under a predetermined fault condition for preventing said electroresponsive device having directional characteristics from permitting false operation of said protective system.

13. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays having such an impedance characteristic that on a resistance-reactance polar diagram for said system said relay impedance characteristic intersects the input impedance locus of said system at a predetermined point thereon and also intersects the fault impedance characteristic of said system at two predetermined points, and a second distance relay having such an impedance characteristic that on said polar diagram said last mentioned relay impedance characteristic does not intersect the portion of said fault impedance characteristic connecting said two predetermined points but intersects said input impedance locus at a different point than said first mentioned relay impedance characteristic and also intersects said first mentioned relay impedance characteristic.

14. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays having such an impedance characteristic that on a resistance-reactance polar diagram for said system said relay impedance characteristic intersects the input impedance locus of said system at a predetermined point thereon and also intersects the fault impedance characteristic of said system at two predetermined points, and a second distance relay having such an impedance characteristic that on said polar diagram said last mentioned relay impedance characteristic does not intersect the portion of said fault impedance characteristic connecting said two predetermined points but does intersect said input impedance locus at a point corresponding to a larger phase displacement of the terminal voltage of said system than the point at which said first mentioned relay impedance characteristic intersects said input impedance locus.

15. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays having such an impedance characteristic that on a resistance-reactance polar diagram for said system said relay impedance characteristic intersects the input impedance locus of said system at a predetermined point thereon and also intersects the fault impedance characteristic of said system at two predetermined points, and a second distance relay having such an impedance characteristic that on said polar diagram said last mentioned relay impedance characteristic intersects said first mentioned relay impedance characteristic at two predetermined points on the same side of said fault impedance characteristic and also intersects said input impedance locus at a different point than said first mentioned relay impedance characteristic.

16. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays having such an impedance characteristic that on a resistance-reactance polar diagram for said system said relay impedance characteristic intersects the input impedance locus of said system at a predetermined point thereon and also intersects the fault impedance characteristic of said system at two predetermined points, a second distance relay having such an impedance characteristic that on said polar diagram said last mentioned relay impedance characteristic intersects said first mentioned relay impedance characteristic at two predetermined points on the same side of said fault impedance characteristic and also intersects said input impedance locus at a different point than said first mentioned relay impedance characteristic, and a third of said relays having such an impedance characteristic that on said polar diagram said last mentioned relay impedance characteristic intersects said first mentioned relay impedance characteristic at two predetermined points on the other side of said fault impedance characteristic and also intersects said input impedance locus at a different point than said second distance relay impedance characteristic.

17. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays being of the directional type and having such an impedance characteristic that on a resistance-reactance polar diagram for said system said relay impedance characteristic intersects the input impedance locus of said system at points outside the out-of-step portion of said input impedance locus whereby said relay is operated by predetermined power swings on said system and said relay impedance characteristic intersects the fault impedance characteristic of said system at predetermined points whereby said relay responds to faults on a predetermined portion of said system, and another of said distance relays being an ohm relay having such an impedance characteristic that on said diagram said last mentioned impedance characteristic intersects said input impedance locus at a point within the out-of-step portion thereof and also intersects said first mentioned relay impedance characteristic at two points on one side of said fault impedance characteristic.

18. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays being of the directional type and having such an impedance characteristic that on a resistance-reactance polar diagram for said system said relay impedance characteristic intersects the input impedance locus of said system at points outside the out-of-step portion of said input impedance locus whereby said relay is operated by predetermined power swings on said system and said relay impedance characteristic intersects the fault impedance characteristic of said system at predetermined points whereby said relay responds to faults on a predetermined portion of said system, another of said distance relays being an ohm relay having such an impedance characteristic that on said diagram said last mentioned impedance characteristic intersects said input impedance locus at a point within the out-of-step portion thereof and also intersects said first mentioned relay impedance characteristic at two points on one side of said fault impedance characteristic, and a third of said relays being another ohm relay having such an impedance characteristic that on said diagram said last mentioned impedance characteristic intersects on the other side of said fault impedance characteristic said input impedance locus at a point within the out-of-step portion thereof and also said first mentioned relay impedance characteristic at two different points.

19. A relay arrangement for effecting a desired control operation in response to predetermined abnormal conditions on an alternating current system comprising a plurality of distance relays arranged when energized from said system at a predetermined point thereof to effect said control operation when said relays are simultaneously in predetermined relative positions, one of said distance relays being of the directional type and having such an impedance characteristic that on a resistance-reactance polar diagram for said system said relay impedance characteristic intersects the input impedance locus of said system at points outside the out-of-step portion of said input impedance locus whereby said relay is operated by predetermined power swings on said system and said relay impedance characteristic intersects the fault impedance characteristic of said system at predetermined points whereby said relay responds to faults on a predetermined portion of said system, and another of said distance relays being an ohm relay having such an impedance characteristic that on said diagram on the same side of the fault impedance characteristic as the intersection of said first mentioned relay impedance characteristic and said input impedance locus said ohm relay impedance characteristic intersects said input impedance characteristic at a point within the out-of-step portion thereof and also intersects said first mentioned relay impedance characteristic at two points.

20. A relay arrangement for effecting a desired control operation in response to predetermined abnormal conditions on an alternating current system comprising a pair of distance relays arranged when energized from said system at a predetermined point thereof to effect said control operation when said relays are simultaneously in predetermined relative positions, said relays having such impedance characteristics that on a resistance-reactance polar diagram for said system said relay impedance characteristics are substantially straight lines which respectively intersect the input impedance locus of said system at different points so located on said locus that the space between them defines a range of unstable power swing and out-of-step conditions of said system.

21. A relay arrangement for effecting a desired control operation in response to predetermined abnormal conditions on an alternating current system comprising a pair of distance relays arranged when energized from said system at a predetermined point thereof to effect said control operation when said relays are simultaneously in prededetermined relative positions, one of said relays being a mho relay having such an impedance characteristic that on a resistance-reactance diagram for said system said mho relay impedance characteristic intersects the input impedance locus of said system at a point outside the out-of-step portion thereof whereby said relay is operated by predetermined power swings and out-of-step conditions on said system and said mho relay impedance characteristic also intersects the fault impedance characteristic of said system at predetermined points whereby the mho relay responds to faults on a predetermined portion of said system, and the other of said distance relays being an ohm relay having such an impedance characteristic that on said diagram said ohm relay impedance characteristic intersects said input impedance locus at such a point that the ohm relay is operated only by out-of-step conditions and by power swings which result in an out-of-step condition and said ohm relay impedance characteristic also intersects said mho relay impedance characteristic at two points located on the same side of said fault impedance characteristic.

22. A relay arrangement for effecting a desired control operation in response to predetermined abnormal conditions on an alternating current system comprising a pair of distance relays arranged when energized from said system at a predetermined point thereof to effect said control operation when said relays are simultaneously in predetermined relative positions, one of said relays being a mho relay having such an impedance characteristic that on a resistance-reactance diagram for said system said mho relay impedance characteristic intersects the input impedance locus of said system at a point outside the out-of-step portion thereof whereby said relay is operated by predetermined power swings and out-of-step conditions on said system and said mho relay impedance characteristic also intersects the fault impedance characteristic of said system at predetermined points whereby the mho relay responds to faults on a predetermined portion of said system, another of said distance relays being an ohm relay having such an impedance characteristic that on said diagram said ohm relay impedance characteristic intersects said input impedance locus at such a point that the ohm relay is operated only by out-of-step conditions and by power swings which result in an out-of-step condition and said ohm relay impedance characteristic also intersects said mho relay impedance characteristic at two points located on the same side of said fault impedance characteristic, and another of said distance relays being a second ohm relay having such an impedance characteristic that on said diagram said second ohm relay impedance characteristic intersects said input impedance locus at another point such that said second ohm relay is operated only by out-of-step conditions and by power swings which result in an out-of-step condition and said second ohm relay impedance characteristic also intersects said mho relay impedance characteristic at two points located on the other side of said fault impedance characteristic from that on which said first mentioned ohm relay impedance characteristic intersects said fault impedance characteristic.

23. Terminal protective equipment for effecting a line segregating operation of circuit interrupting means at a terminal of an alternating current line section comprising line-fault-responsive relaying means adapted when connected at said terminal to respond selectively to a range of line impedances in the vicinity of the area of the line fault impedances, said relaying means being characterized by including a plurality of line-fault-responsive elements having overlapping response characteristics which when plotted on an impedance diagram representing line reactance plotted against line resistance jointly bound a limited response area which is elongated in the direction of the furtherest line fault impedance.

24. The invention as defined in claim 23 characterized by one of said overlapping characteristics being a circle having a center lying in the vicinity of the internal fault impedance area of the protected line section and displaced considerably from the origin.

25. The invention as defined in claim 23 characterized by said elongated response area being within the overlapping area of the response characteristics of two of said line-fault-responsive elements.

26. The invention as defined in claim 23 characterized by said elongated response area extending out in the internal fault direction of the line impedance further than the impedance corresponding to the length of the protected line section.

27. The invention as defined in claim 23 characterized by said elongated response area extending out in the internal fault direction of the line impedanec further than the impedance corresponding to the length of the protected line section, and said relaying means also including a first zone distance responsive element for segregating that portion of said elongated response area which is readily distinguishable as corresponding to faults which are closer than the far end terminal of the protected line section.

28. The invention as defined in claim 23 characterized by said elongated response area being within the overlapping area of the response characteristics of two of said line-fault-responsive elements, in combination with a first zone distance responsive element for segregating that portion of said elongated response area which is readily distinguishable as corresponding to faults which are closer than the far end terminal of the protected line section.

29. A relay arrangement for effecting a predetermined control operation at a desired point in an alternating current power system in response to an out-of-step condition on said system comprising an ohm relay arranged so that when it is connected to said system at said desired point it has on a resistance-reactance diagram for said system an impedance characteristic which is approximately parallel to the portion of the system impedance characteristic between said desired point and the electrical center of the system, and control means responsive to a predetermined operation of said relay.

30. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are displaced relative to each other, and means controlled by said relays for effecting said predetermined control operation.

ALBERT R. van C. WARRINGTON.